3,692,506
HIGH BTU GAS CONTENT FROM COAL
Cecil J. Johnson, Columbia City, Ind., assignor to Total
 Energy Corporation, Columbia City, Ind.
Filed Feb. 13, 1970, Ser. No. 11,151
Int. Cl. C10j *3/00;* C10k *3/00*
U.S. Cl. 48—210                                          5 Claims

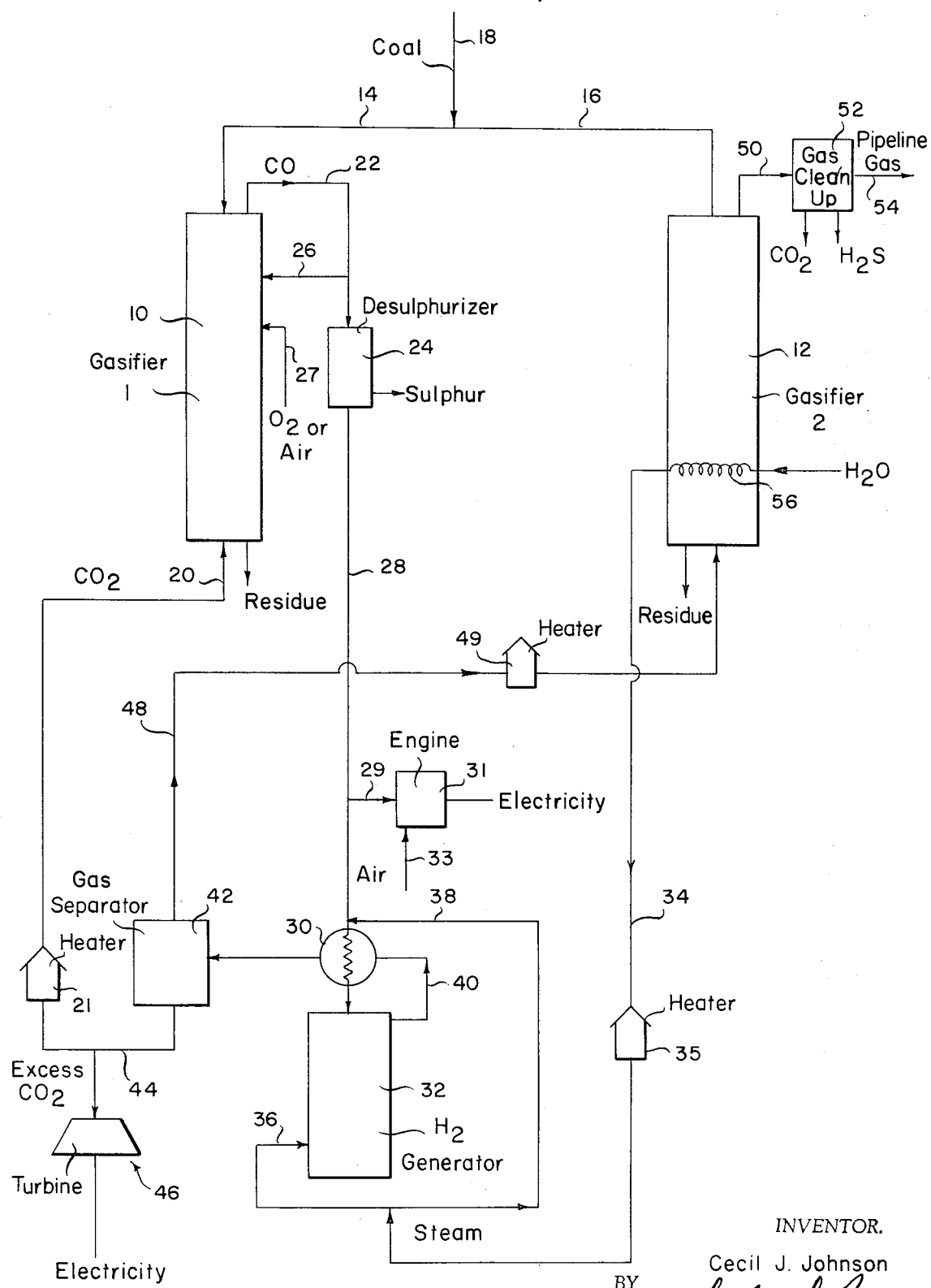

ABSTRACT OF THE DISCLOSURE

A unitary process for the production of high methane content gas employing a single supply of coal, char or other carbonaceous material which is supplied to first and second gasifiers. The first gasifier produces carbon monoxide which is transferred to a hydrogen generator for reaction with steam to produce hydrogen. The hydrogen produced thereby is reacted with the carbonaceous materials in the second gasifier to produce the high methane content gas.

---

This invention relates to the production of high methane content gas and particularly the production of the gas by an integrated process using coal or other carbonaceous materials for the production of hydrogen which is then used to produce the high methane content gas.

Prior art methods of producing methane gas involve the reaction of hydrogen produced from an outside source. That is, hydrogen is usually produced in a separate process and oftentimes in a different geographic area. This results in an economically unfeasible process for the production of methane gas. Further, in other processes using hydrogen, steam is injected along with the hydrogen into the hydrogasifier to better control the temperature inside the hydrogasifier. This requires larger equipment. Also large amounts of carbon monoxide are produced which must go through a shift conversion to decrease the CO content of the product gas.

It is an object of this invention to provide a process whereby methane gas can be produced in an integrated process not requiring the separate production and transportation of hydrogen.

It is another object of this invention to provide a process whereby methane gas is produced using only one primary outside source of raw materials; namely, coal or other carbonaceous materials.

It is another object of this invention to provide a process whereby methane gas is produced by the reaction of coal, char or other carbanaceous materials and hydrogen as opposed to prior art operations whereby hydrogen and temperature controlling steam are injected into a hydrogasifier. The direct injection of steam results in an exorbitantly high amount of carbon monoxide that must go through a shift conversion. This shift conversion also produces carbon dioxide in addition to hydrogen. It is then necessary to separate the carbon dioxide from the methane gas in a rather difficult and time consuming operation. Therefore, it is preferable to minimize the amount of carbon monoxide formed in the hdrogasification reactor by using an indirect heat exchange system to control the hydrogasifier temperature as opposed to the direct injection of steam.

More specifically the process of this invention comprises the steps of feeding coal to first and second gasifiers. Carbon monoxide is produced in the first gasifier by the reaction of carbon dioxide with the carbonaceous material. The carbon monoxide is passed through a desulphurizer and conveyed to a hydrogen generator where it is reacted with steam to prdouce hydrogen and carbon dioxide. The carbon dioxide is separated from the hydrogen and returned to the first gasifier to assist in the production of carbon monoxide. The hydrogen is conveyed to the second gasifier where it is reacted with the carbonaceous materials to provide methane gas which is taken from the second gasifier and stripped of carbon dioxide, hydrogen sulfide and any other contaminants present. Steam used in the hydrogen generator is prdouced by a heat exchange process with the second gasifier—the reaction in the second gasifier being highly exothermic.

These and other objects of the invention will become more apparent to those skilled in the art by reference to the following detailed description when viewed in light of the accompanying drawings wherein:

The drawing is a schematic showing of the process of this invention.

Referring now to figure, two gasifiers 10 and 12 are provided having coal feeds 14 and 16 respectively from a coal source 18. The gasifiers are filled with coal and hot carbon dioxide is introduced to the first gasifier 10 through line 20. The carbon dioxide reacts with the coal or other carbonaceous materials in the gasifier to produce carbon monoxide which is taken off via line 22. The reaction is $CO_2 + C + Heat \rightarrow 2CO$. The gasification process is fully disclosed in my copending application Ser. No. 810,101, filed Mar. 25, 1969, and now U.S. Pat. No. 3,635,672 entitled Carbon Gasification Processing Method and Apparatus. The major portion of the carbon monoxide taken from the gasifier 10 is conveyed to a desulphurizer 24 and a minor portion is returned to the gasifier via line 26 to react with oxygen in the gasifier in the reaction

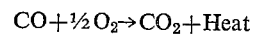

This helps to replenish the heat lost in the basic endothermic reaction between the carbon dioxide and the coal. Supplemental $O_2$ is introduced to the gasifier at 27 from a suitable outside source. The desulphurized carbon monoxide is conveyed through line 28 and through a heat exchanger 30 to hydrogen generator 32. Steam is conveyed to the hydrogen generator through lines 34 and 36. The reaction in the hydrogen generator is a

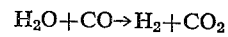

A portion of the steam is introduced to the carbon monoxide stream at line 38 prior to its entering the hydrogen generator helping to minimize coking when the carbon monoxide enters the hydrogen generator.

A portion of the hot CO in line 28 can be taken off through line 29 and is burned with air to drive the engine 31. The air is introduced to the engine through line 33. The engine is shown as an electricity generator power means, although the engine can be used for any number of purposes.

The gases produced in the hydrogen generator, mainly hydrogen and carbon dioxide, are taken off via line 40 and pass in heat exchange relationship with the incoming carbon monoxide at 30 to heat the carbon monoxide and steam mixture since the steam lowers the temperature of the CO upon injection. The gases are then passed through gas separator 42 wherein the carobn dioxide is separated from the hydrogen and taken off at line 44. A portion of the carbon dioxide may be expanded through a turbine or the like generally indicated by numeral 46 for the production of electricity. The major portion of the carbon dioxide is conveyed through line 20 and heater 21 to the first gasifier 10 to assist in the production of the carbon monoxide.

The hydrogen is taken from the gas separator 42 via line 48 and conveyed to the second gasifier 12 through heater 49 wherein it is reacted with the coal in the gasifier by the reaction $2H_2+C \rightarrow CH_4$. The product gas is taken off via line 50, conveyed through a gas cleanup system 52 to remove carbon dioxide, hydrogen sulfide and any other impurities, and then is conveyed to storage via line 54. The reaction of the hydrogen and carbon in gasifier 12 is highly exothermic and in order to control the heat, water is passed through the gasifier in heat exchange relationship via line 56 whereby the water is heated to steam and conveyed via line 34 to the hydrogen generator 32 as described above. Additional heat is supplied by heater 35. In the past, steam has been directly introduced into the hydro-gasifier with the hydrogen; however, in that reaction CO is formed which then must go through a shift reaction which forms hydrogen and an exorbitantly high amount of carbon dioxide that must be removed from the product gases.

Examples that will help to illustrate the present invention are as follows:

Example 1.—In a bench scale unit, 2.4#/hr. of crushed and dried coke was fed to the gasifier with 1.8#/hr. of the same type coke to the hydrogasifier unit. In both units, the coke flowed downward, countercurrent to the upward flow of gas—carbon dioxide in the gasifier and hydrogen in the hydrogasifier. The exothermic heat in the hydrogasifier was removed by cooling coils inside this unit and using water as the fluid and this provided some heat to produce steam for the hydrogen generator. In the gasifier 9.4#/hr. of carbon dioxide heated to 2100° F. was fed into the bottom. 10.4#/hr. of carbon monoxide was produced and 2.4#/hr. of this along with stoichiometric quantities of oxygen were used to replenish the endothermic heat of reaction of the carbon dioxide and coke. The gasifier was maintained at 2000° F. and 100 p.s.i.a. pressure. The remaining amount of CO (8#/hr.) with 11#/hr. of steam were sent to the hydrogen generator. An auxiliary heater was used to produce the steam. In addition, part of the steam was injected into the CO steam prior to entering the hydrogen generator and the exit gases provided some additional heat. The first stage of the generator was maintained at 1000° F. and 90 p.s.i.a. while the second stage was maintained at 450° F. and 90 p.s.i.a. pressure. The exit gases from the $H_2$ generator were cooled to remove the water and the $CO_2$ was removed or separated from the hydrogen by conventional methods using a caustic scrubbing unit. The carbon dioxide was regenerated from the caustic solution, compressed and heated to 2100° F. and sent back to the gasifier. Any excess $CO_2$ was vented prior to compressing the gas. 0.45 #/hr. of hydrogen was recovered. The hydrogen was compressed, heated to 950° F. and sent to the bottom of the hydrogasifier for reaction with the coke flowing downward. The reaction produced 1.5#/hr. of 80% methane gas. The hydrogasifier was maintained at 1200° F. and 475 p.s.i.a. during the test run.

Example 2.—The gasifier was operated under the same conditions as Example 1 with respect to temperature, pressure, coke feed rate, $CO_2$ feed rate and temperature, CO recycle and $O_2$ feed for reaction with the CO to supply the endothermic heat needed for the gasification reaction. The first stage of the hydrogen generator was maintained at 950° F. and the second stage at 425° F., both at a pressure of 500 p.s.i.a. with the same feed rates as the previous example. Operation under a higher pressure decreases the size of equipment required for commercial applications. The hydrogen from the hydrogen generator (0.45#/hr.) was compressed to 1010 p.s.i.a. and heated to 1400° F. before injection into the hydrogasifier with the coke flowing downward at a feed rate of 1.8#/hr. At these operating conditions, 1.85#/hr. of pipeline gas with a methane content of 96% was produced. The hydrogasifier was maintained at 1400° F. and 1000 p.s.i.a.

It is to be understood that these are only two examples of the method of this invention for the production of high methane content gas from coke and that other conditions of pressures, temperatures, feed rates, etc. may be varied without departing from the said invention.

It is to be understood that in addition to coke, coal, char or other carbonaceous materials may be used.

In a general manner, while there has been disclosed effective and efficient embodiments of the invention, it should be well understood that the invention is not limited to such embodiments as there might be changes made in the arrangement, disposition, and form of the parts without departing from the principle of the present invention.

I claim:

1. A method of producing high methane content gas comprising the steps of reacting carbon and carbon dioxide in a first gasifier to produce carbon monoxide, passing the said carbon monoxide to a hydrogen generator and reacting the carbon monoxide with steam to produce hydrogen and carbon dioxide, separating the carbon dioxide from the hydrogen and recycling it to the gasifier for the production of additional carbon monoxide, reacting the hydrogen with carbon in a second gasifier to produce high methane content gas, producing said steam for use in the reaction with carbon monoxide to produce hydrogen and carbon dioxide by passing water in heat exchange relationship with said second gasifier whereby the water is converted to steam and the temperature in said second gasifier is reduced, and cleaning said high methane content gas to remove carbon dioxide, hydrogen sulfide and any other impurities present.

2. A method of producing high methane content gas comprising the steps of reacting carbon and carbon dioxide heated to 2100° F. in a first gasifier to produce carbon monoxide, maintaining said gasifier at 2000° F. and 100 p.s.i.a., passing the said carbon monoxide to a hydrogen generator having first and second stages, reacting the carbon monoxide with steam in the hydrogen generator maintained at 1000° F. and 90 p.s.i.a. in the first stage and 450° F. and 90 p.s.i.a. in the second stage to produce hydrogen and carbon dioxide, separating the carbon dioxide from the hydrogen, reheating it and recycling it to the gasifier for the production of additional carbon monoxide, heating the hydrogen to 950° F. and reacting it with carbon in a second gasifier maintained at a temperature of 1200° F. and a pressure of 470 p.s.i.a. to produce high methane content gas and cleaning said high methane gas to remove carbon dioxide, hydrogen sulfide and any other impurities present.

3. A method of producing high methane content gas comprising the steps of reacting carbon and carbon dioxide heated to 2100° F. in a first gasifier to produce carbon monoxide, maintaining said gasifier at 2000° F. and 100 p.s.i.a., passing the said carbon monoxide to a hydrogen generator having first and second stages, reacting the carbon monoxide with steam in the generator and maintaining said generator at 950° F. and 500 p.s.i.a in the first stage and at 425° F. and 500 p.s.i.a in the second stage, to produce hydrogen and carbon dioxide, separating the carbon dioxide from the hydrogen reheating and recycling it to the gasifier for the production of additional carbon monoxide, heating the hydrogen to 1400° F., compressing it to 1010 p.s.i.a. and reacting it with carbon in a second gasifier which is maintained at 1400° F. and 1000 p.s.i.a. to produce high methane content gas, and cleaning said high methane content gas to remove carbon dioxide, hydrogen sulfide and any other imprities present.

4. The method of claim 2 wherein water is passed in heat exchange relationship with the second gasifier to preheat the water and further heating the water through heater means to produce steam for the reaction in the steam generator.

5. The method of claim 3 wherein water is passed in heat exchange relationship with the second gasifier to preheat the water and further heating the water through heater means to produce steam for the reaction in the steam generator.

References Cited

UNITED STATES PATENTS

| 3,506,309 | 4/1970 | Von Hippel | 299—2 |
| 2,654,661 | 10/1953 | Gorin | 48—210 X |
| 2,840,462 | 6/1958 | Gorin | 48—203 X |
| 3,503,724 | 3/1970 | Benson | 48—203 X |

MORRIS O. WOLK, Primary Examiner

R. E. SERWIN, Assistant Examiner

U.S. Cl. X.R.

23—204 M; 48—196 R; 252—373